United States Patent
Porat et al.

(10) Patent No.: US 7,149,243 B2
(45) Date of Patent: Dec. 12, 2006

(54) SYSTEM AND METHOD FOR ESTABLISHING AN XDSL DATA TRANSFER LINK

(75) Inventors: Boaz Porat, Haifa (IL); Christian Fleischhacker, Pischeldorf (AT); Michael Staber, Villach (AT); Hubert Weingerger, Soboth (AT)

(73) Assignee: Infineon Technologies AG, Munich (DE)

( * ) Notice: Subject to any disclaimer, the term of this patent is extended or adjusted under 35 U.S.C. 154(b) by 810 days.

(21) Appl. No.: 09/869,215

(22) PCT Filed: Feb. 13, 2001

(86) PCT No.: PCT/EP01/01559

§ 371 (c)(1),
(2), (4) Date: Aug. 11, 2003

(87) PCT Pub. No.: WO02/065746

PCT Pub. Date: Aug. 22, 2002

(65) Prior Publication Data

US 2004/0057509 A1   Mar. 25, 2004

(51) Int. Cl.
*H04B 1/38* (2006.01)
*H04L 5/16* (2006.01)
*H04L 7/00* (2006.01)

(52) U.S. Cl. .................... 375/222; 375/368

(58) Field of Classification Search ........... 375/222, 375/238, 368; 358/1.15; 329/312; 455/574
See application file for complete search history.

(56) References Cited

U.S. PATENT DOCUMENTS

| | | | |
|---|---|---|---|
| 5,077,552 A * | 12/1991 | Abbate | 340/825.25 |
| 5,525,962 A * | 6/1996 | Tice | 340/506 |
| 5,790,946 A | 8/1998 | Rotzell | |
| 5,956,323 A | 9/1999 | Bowie | |
| 6,396,953 B1 * | 5/2002 | Abbey | 375/150 |
| 6,496,549 B1 * | 12/2002 | Crawford | 375/320 |
| 6,522,668 B1 * | 2/2003 | Singleton et al. | 370/480 |
| 6,523,126 B1 * | 2/2003 | Brabenac | 713/323 |
| 6,556,580 B1 * | 4/2003 | Wang et al. | 370/412 |
| 6,570,912 B1 * | 5/2003 | Mirfakhraei | 375/222 |
| 6,658,576 B1 * | 12/2003 | Lee | 713/320 |
| 6,678,728 B1 * | 1/2004 | Uppunda et al. | 709/222 |
| 6,795,438 B1 * | 9/2004 | Tai et al. | 370/395.2 |

FOREIGN PATENT DOCUMENTS

| | | | |
|---|---|---|---|
| EP | 1 011 206 A2 | | 6/2000 |
| WO | WO 00/02335 | * | 1/2000 |
| WO | WO 00/52919 | | 8/2000 |

OTHER PUBLICATIONS

G.992.2 Splitterless Asymmetrical Digital Subscriber Line (ADSL) Transceivers -06/99.

* cited by examiner

Primary Examiner—Betsy L. Deppe
(74) Attorney, Agent, or Firm—Welsh & Katz, Ltd.

(57) ABSTRACT

An xDSL data transfer system for data transfer includes at least one xDSL user modem connected via a data transfer medium to a corresponding xDSL modem within a central office, in which the xDSL user modem generates a pulse length modulated wake-up signal for switching the corresponding xDSL modem within the central office from a sleep mode to an operation mode.

17 Claims, 6 Drawing Sheets

PRIOR ART

SYSTEM AND METHOD FOR ESTABLISHING AN XDSL DATA TRANSFER LINK

BACKGROUND OF THE INVENTION

The invention relates to a system and a method for establishing a data transfer link between an xDSL user modem and a corresponding xDSL modem within a central office.

DESCRIPTION OF THE RELATED ART

FIG. 1 shows a conventional xDSL system with several xDSL user modems, each connected via a telephone line to a corresponding xDSL modem within the central office. In a normal operation, the conventional xDSL modem within the central office is operating continuously and tries to establish a data transfer link with the corresponding remote user xDSL modem connected via a telephone line. When the user xDSL modem is ready for data transfer, a data link is established by means of a start-up procedure. A central office comprises a very large number of xDSL modems connecting the users of the telephone network. The disadvantage of the conventional xDSL system as shown in FIG. 1 is that the xDSL modems within the central office continuously try to establish a connection with the corresponding user xDSL modem and therefore consume much power. An xDSL modem within a central office consumes up to 1,5 Watt of power. Since the number of xDSL modems within a central office can be very large, the power consumption of all xDSL modems is significant.

BRIEF SUMMARY OF THE INVENTION

Accordingly, it is the object of the present invention to provide a method and a system for data transfer between an xDSL user modem and a corresponding xDSL modem within a central office which consume a minimum amount of power.

This object is achieved by a method for establishing a data transfer link between an xDSL user modem and a corresponding xDSL modem within a central office having the features disclosed herein and by an xDSL data transfer system.

The present invention provides a method for establishing a data transfer link between an xDSL user modem and the corresponding xDSL modem within the central office comprising the following steps:

generating a wake-up bit pattern identifying the user modem, pulse length modulating the generated wake-up bit pattern to generate a pulse length modulated wake-up signal, transmitting the pulse length modulated wake-up signal from the user xDSL modem via a data transfer medium to the corresponding xDSL modem within the central office, demodulating the transmitted wake-up signal by the xDSL modem within the central office, comparing the demodulated wake-up signal with a stored wake-up bit pattern for the detection of a transmission of the wake-up bit pattern, generating a wake-up command signal for switching the xDSL modem within the central office from a sleep mode to an operation mode for data transfer, when the wake-up bit pattern is detected.

In the sleep mode, the power consumption of the xDSL modem within the central office is low, thus minimizing the overall power consumption within the central office.

In a preferred embodiment of the method according to the present invention, the xDSL modem within the central office commences a start-up procedure, when it is switched to the operation mode.

In a further embodiment, the wake-up signal is transmitted periodically by the xDSL user modem.

In a further embodiment, the xDSL modem within the central office is switched from the operation mode to the sleep mode when the data transfer is finished.

In a further preferred embodiment, a detection counter is incremented when the wake-up bit pattern is detected.

In a further preferred embodiment, a wake-up command signal is generated when the detection counter reaches a predetermined threshold value.

In a preferred embodiment, the threshold value for the detection counter is adjusted.

The invention provides further an xDSL data transfer system for data transfer comprising at least one xDSL user modem connected via a data transfer medium to a corresponding xDSL modem within the central office, wherein the xDSL user modem generates a wake-up signal for switching the corresponding the xDSL modem within the central office from a sleep mode to an operation mode.

In a preferred embodiment, the wake-up signal is pulse-length modulated.

In a preferred further embodiment, the xDSL user modem comprises generating means for generating a wake-up pattern identifying the xDSL user modem, and modulating means for pulse length modulation of the wake-up pattern to generate a pulse length modulation wake-up signal, wherein the pulse length modulated wake-up signal has a spectrum within the xDSL upstream frequency band.

In a preferred embodiment of the xDSL data transfer system according to the present invention, the generated wake-up bit pattern comprises 16 bits.

In a further embodiment, each bit of the wake-up bit pattern determines the duration of a pulse in the pulse length modulated signal.

In a still further embodiment, the level of the wake-up signal is less than a predetermined maximum signal level.

In a further embodiment of the xDSL data transfer system according to the present invention, the xDSL modem within the central office comprises demodulating means for demodulating the received analog pulse length modulated signal, storing means for storing a wake-up bit pattern which identifies a user modem, detecting means for detecting the demodulated wake-up bit pattern by comparing the demodulated received signal with the stored wake-up bit pattern, wake-up command generating means for generating a wake-up command to switch the xDSL modem from the sleep mode to the operation mode, when the received wake-up bit pattern is identical with the stored wake-up bit pattern.

In a further embodiment of the xDSL data transfer system according to the present invention, the demodulating means of the xDSL modem comprises a gain sequencer for amplifying the received analog signal with an adjustable gain, rectifying means for rectifying the amplified signal, a low-pass filter for filtering the rectified signal, and a comparator for comparing the filtered signal with an adjustable threshold generating an asynchronous pulse train supplied to the detecting means.

In a preferred embodiment of the xDSL data transfer system according to the present invention, the detecting means comprises
a synchronization means for synchronizing the asynchronous pulse train with an internal clock signal,
a pulse length detecting circuit for detecting the pulse length of each pulse in the synchronized pulse train,
a bit pattern generating means for generating a bit pattern depending on the detected pulse length,
a register for temporarily storing the received bit pattern,
a comparator which compares the received bit pattern with the stored wake-up bit pattern and which increments a counter when the received bit pattern and the stored wake-up bit pattern is identical.

In a preferred embodiment of the xDSL system according to the present invention, the wake-up command generating means generates the wake-up command when the counter reaches a predetermined threshold value.

In a preferred embodiment of the xDSL system according to the present invention the xDSL modems are VDSL modems.

In a preferred embodiment of the xDSL data transfer system, the data transfer medium is a telephone line.

The invention provides further an xDSL user modem comprising
a generating means for generating a wake-up pattern identifying the xDSL user modem, and
a modulating means for pulse length modulation of the wake-up bit pattern to generate the pulse length modulated wake-up signal,
wherein the pulse length modulated wake-up signal has a spectrum within the xDSL upstream frequency band.

The invention provides further an xDSL central office modem within a central office comprising
demodulating means for the demodulation of a received analog pulse length modulated signal,
storing means for storing a wake-up bit pattern which identifies the user modem connected to the xDSL office modem via a data transfer medium,
detecting means for detecting a demodulated wake-up bit pattern by comparing the demodulated received signal with the stored wake-up bit pattern,
a wake-up command generating means for generating a wake-up command to switch the xDSL modem from the sleep mode to the operation mode when the received wake-up bit pattern is identical with the stored wake-up pattern.

In the following description, a preferred embodiment of a method for establishing a data transfer link and an xDSL data transfer system for data transfer according to the present invention is described with reference to the drawings.

DETAILED DESCRIPTION OF THE INVENTION

Figure 1:
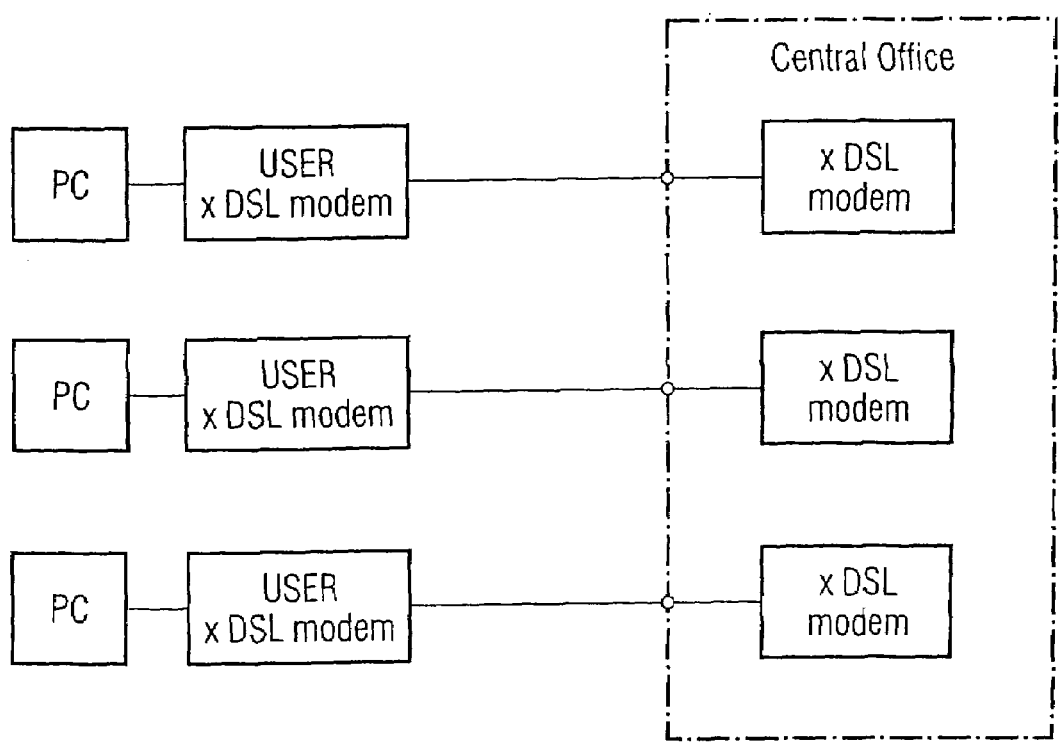
FIG. 1 shows an xDSL data transfer system for data transfer according to the state of the art.
Figure 2:
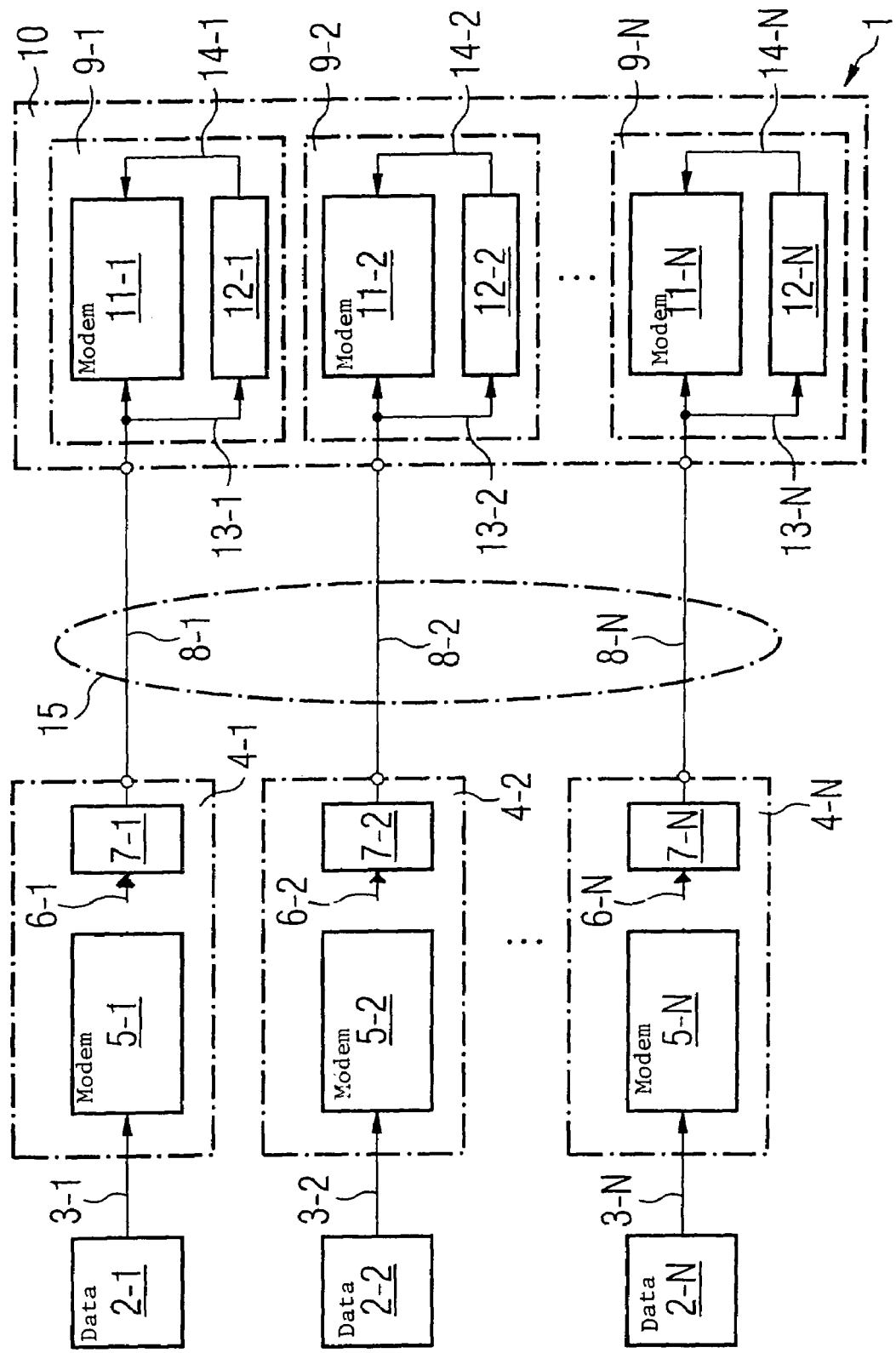
FIG. 2 shows an xDSL data transfer system for data transfer according to the present invention.

The xDSL data transfer system 1 for data transfer according to the present invention is shown in FIG. 2. The xDSL data transfer system comprises N data sources 2-1 to 2-N, each generating a data upstream signal. The data upstream signal is supplied via signal lines 3-1 to 3-N to the corresponding xDSL user modem 4-1 to 4-N. The xDSL user modem 4 consists of a conventional xDSL modem 5 which is connected on its output side via a line 6 to a wake-up signal generating unit 7 which generates a wake-up signal. The xDSL user modem 4 is connected via a physical medium, e.g. a twisted telephone line, to a corresponding xDSL modem 9 within a central office 10. Each xDSL modem 9 of the central office 10 comprises a conventional xDSL modem 11 and a wake-up signal detection unit 12 for detecting a wake-up signal received via the telephone line 8. The wake-up signal detection unit 12 is connected to the telephone 8 via line 13 and sends a wake-up command signal via a control line 14 to the xDSL modem 11 to switch the xDSL modem from a sleep mode to an operation mode for data reception.

The wake-up signal generating unit 7 of the xDSL user modem 4 generates a wake-up signal via the telephone line 8 to its corresponding xDSL modem 9 within the central office 10. The transmitted wake-up signal is detected by the wake-up signal detection unit 12 so that the xDSL modem 11 is switched from a sleep mode to an operation mode for data transfer. Each user modem 4 generates a wake-up signal which is unique to the user modem 4 so that the wake-up signal detection unit 12 is insensitive to far end cross-talk (FEXT) between different telephone lines 8. The unique wake-up signal for each user modem 4 guarantees that erroneous wake-ups of other xDSL-modems as a consequence of far end cross-talk (FEXT) are prevented. Accordingly, the different telephone lines 8-1 to 8-N can be arranged in a common telephone cable 15.

When an xDSL user modem 4 is inactive, the corresponding xDSL modem 9 within the central office 10 is in a sleep mode. Since a data source 2 like a personal computer 2 normally does not send a data upstream signal to the central office for the most part of the day, the corresponding xDSL modem 9 within the central office 10 is in the sleep mode for most of the time. In the sleep mode, the xDSL modem 9 consumes only a minimum necessary amount of electrical power. The xDSL modem 9 is switched to the power-consuming operation mode only when the wake-up signal from the corresponding xDSL user modem 4 is detected. When the user turns on the power of the user modem 4 and wishes to establish a data connection, the user modem 4 generates a wake-up signal and sends it via the telephone line 8 to the corresponding xDSL modem 9 in the central office. The wake-up signal detection unit 12 detects a received wake-up signal-and switches the xDSL modem 9 to an operation mode. The xDSL modem 9 then commences a start-up procedure. When the user ends the data connection, the xDSL modem 9 within the central office 10 is switched back to the sleep mode.

Figure 3:
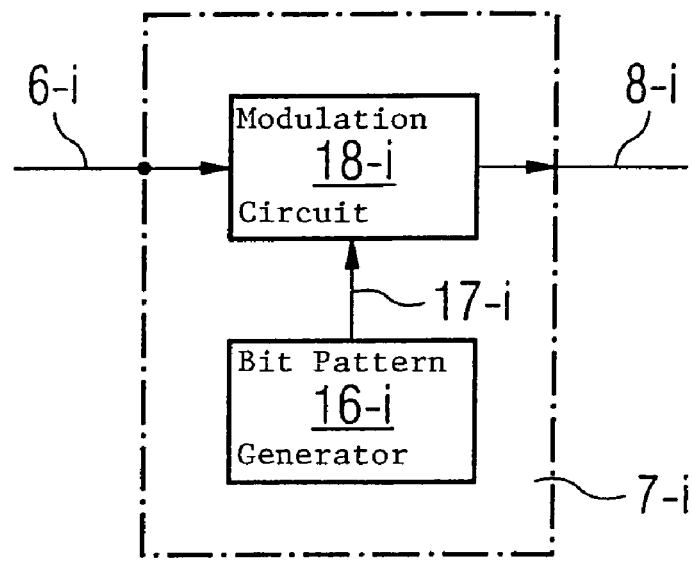
FIG. 3 shows a block diagram of a wake-up signal generating unit within an xDSL user modem according to the present invention.

FIG. 3 shows a wake-up signal generating unit 7 within an xDSL user modem 4 according to the present invention. The wake-up signal generating unit 7 comprises a wake-up pattern generating means 16 for generating a wake-up bit pattern identifying the xDSL user modem 4. The generated wake-up bit pattern is supplied via a line 17 to a modulation means 18. The modulation means 18 performs a pulse length modulation of the upstream data signal supplied from the data source 2 via data line 6. The upstream data signal is pulse length modulated with the wake-up bit pattern to generate a pulse length modulated wake-up signal which is transmitted via line 8 to the corresponding xDSL modem 9 within the central office 10. The pulse length modulated wake-up signal has a frequency range within the xDSL upstream frequency band. For a VDSL application, the upstream frequency band is between 3.5 MHz and 5 MHz. The generated wake-up signal can pass through passive magnetic elements such as transformers, and does not get blocked before it reaches the wake-up detection unit 12 within the xDSL modem 9 in the central office 10.

In a preferred embodiment, the wake-up bit pattern generating means 16 generates a wake-up bit pattern which comprises 16 bits. This comparatively short bit pattern ensures that the wake-up process is completed within a relatively short time, e.g. within 100 milliseconds.

Figure 7:
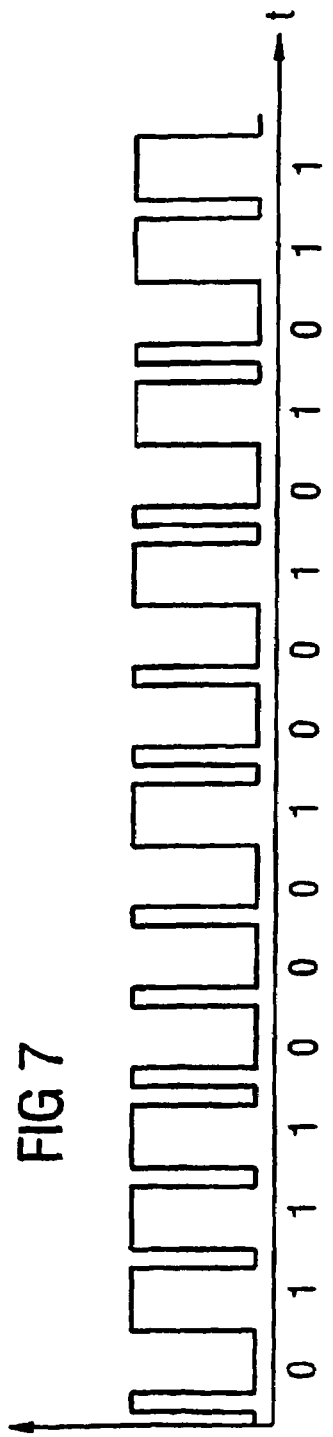
FIG. 7 shows a timing diagram of the pulse length modulated wake-up signal according to the present invention.

FIG. 7 shows an example for a wake-up signal generated by the wake-up generating means 7 of a user xDSL modem 4. The wake-up signal has a flat frequency spectrum in the xDSL upstream frequency band modulated by a duty cycle modulation. A sequence of N bits each of a duration of d microseconds is transmitted periodically by the user modem 4 until it is detected by the wake-up detection unit 12 within the xDSL modem 9 of the central office 10. Each bit of the wake-up bit pattern is represented by a pulse of $d_{on}$ microseconds on and $d_{off}$ microseconds off, where $d_{on} < d_{off}$, if the bit is logical low, and $d_{on} > d_{off}$ if the bit is logical high. In a preferred embodiment, the wake-up bit pattern comprises 16 bits, duration d is approximately 100 microseconds, wherein $d_{on} = 0.25$ d, when the bit is logical low, and $d_{on} = 0.75$ d, when the bit is logically high. FIG. 7 shows an example for a wake-up signal during one period of the wake-up signal. FIG. 7 shows only the signal envelope. The signal itself is a random noise signal whose spectrum coincides with the spectrum of a standard xDSL upstream signal.

Figure 4:
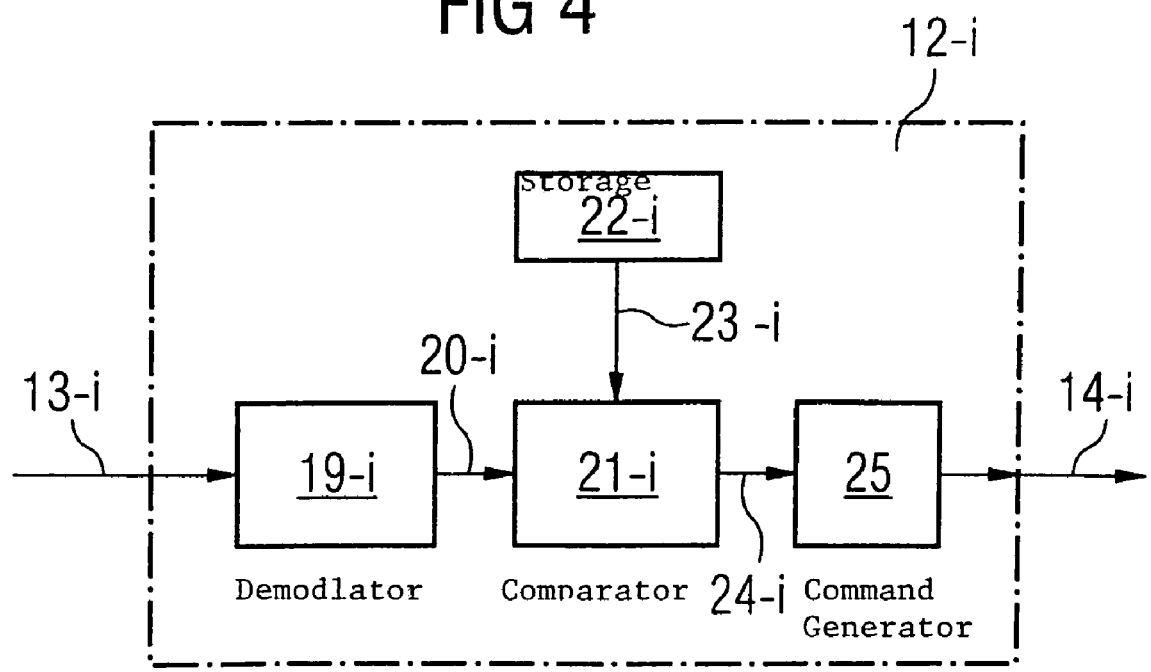
FIG. 4 shows a block diagram of a wake-up signal detection unit of an xDSL modem within the central office according to the present invention.

FIG. 4 shows a block diagram of the wake-up signal detection unit 12 within an xDSL modem 9 of the central office 10. The wake-up signal detection unit 12 comprises demodulating means 19 for demodulating the received analog pulse length modulated signal. The demodulating means 19 are connected via a line 20 to comparing means 21 which compare the demodulated received bit pattern with the wake-up bit pattern stored within storing means 22. The storing means 22 store a wake-up bit pattern which identifies the corresponding user modem 4. The storing means 22 are connected to the comparing means 21 via a line 23. If the comparator 22 detects that the demodulated bit pattern is identical with the stored wake-up bit pattern, it sends a detection signal via a line 24 to a wake-up command generating means 25 which generates the walk-up command and transmits the wake-up command via a control line 14 to the corresponding modem 11. The wake-up command switches the xDSL modem 9 from the sleep mode to the operation mode. The wake-up signal detection unit 12 can be implemented by a simple circuitry that does not require large power. Accordingly, the power consumption of the wake-up signal detection unit 12 is only a small percentage of the power consumed by the complete xDSL modem 9. The wake-up signal detection unit is insensitive to the absolute power level of the received wake-up signal in order to accommodate all line distances. The wake-up signal detection unit 12 is provided for detecting a bit pattern, not a signal energy.

Figure 5:
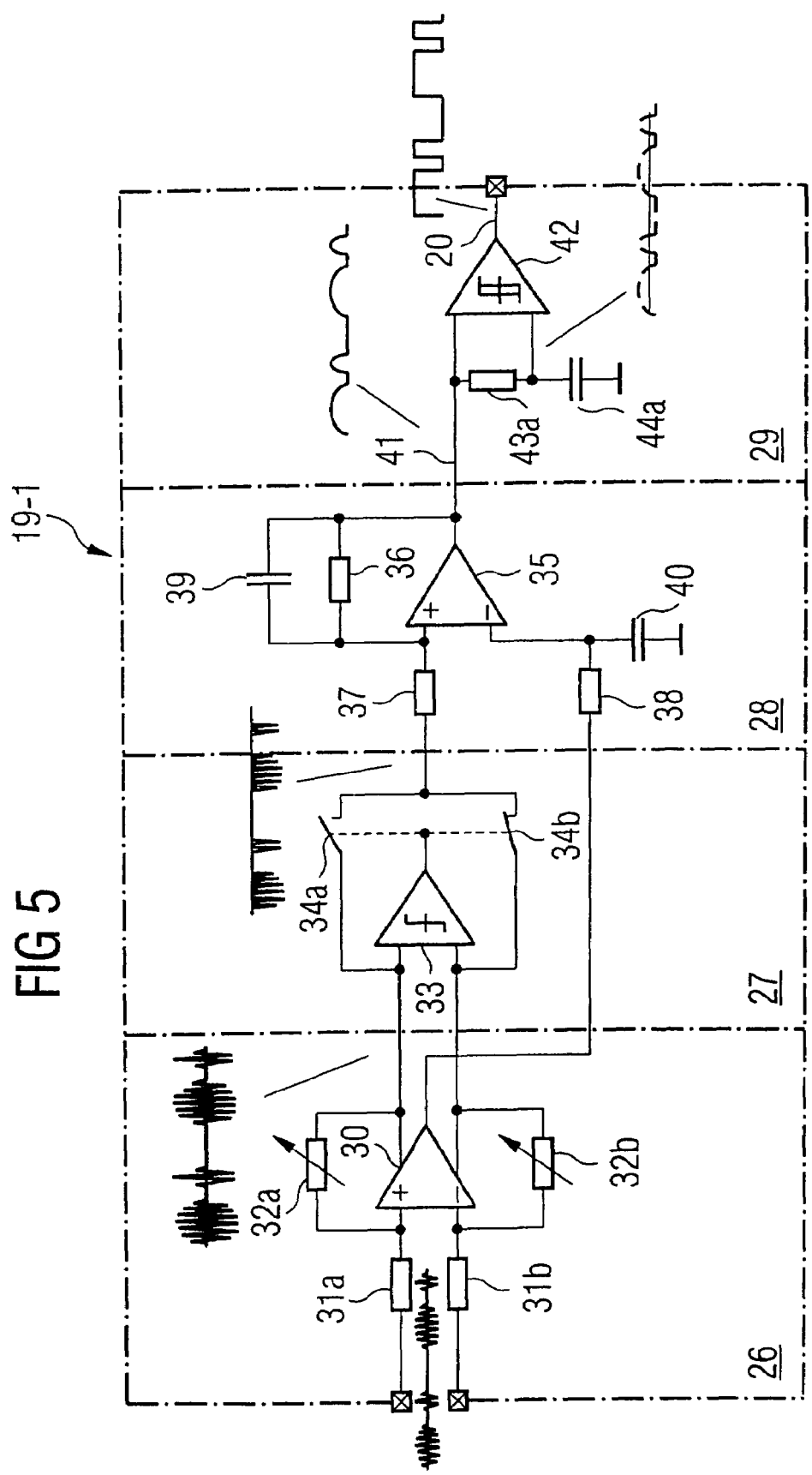
FIG. 5 shows a demodulating means of an xDSL modem within the central office according to the present invention.

FIG. 5 shows a preferred embodiment of the demodulating means 19 within the wake-up detection unit 12 according to the present invention. The demodulating means 19 comprises a gain sequencer 26 for amplifying the received analog signal with an adjustable gain, the rectifying circuit 27 rectifying the amplified signal, a low-pass filter 28 for filtering the rectified signal and a comparator 29 for comparing the filtered signal with an adjustable threshold generating an asynchronous pulse train supplied to the detecting means 21. The gain sequencer 26 amplifies the incoming wake-up signal and comprises an operation amplifier 30, resistors 31a, 31b and adjustable resistors 32a, 32b. The gain sequencer 26 amplifies the incoming wake-up signal with an increasing gain until the wake-up signal is detected by the wake-up detection means. The rectifying means 27 comprising an operational control amplifier 33 which controls switches 34a, 34b supplies a rectified signal to the following low-pass filter 28. The low-pass filter 28 shown in FIG. 5 removes the high frequency noise and tracks the signal envelope of the received wake-up signal. The low-pass filter 28 further removes residual DC signal components. The low-pass filter 28 is an active filter comprising an operational amplifier 35, resistors 36, 37, 38 and capacitors 39, 40. The output of the operational amplifier 35 is connected via line 41 to comparing means 29 including a comparator 42, a resistor 43a and a capacitor 44a.

The output of the comparator 42 is connected via line 20 to the bit pattern comparing means 21 comparing the output bit pattern of the comparator 42 with the stored wake-up bit pattern. The bit pattern comparing means 21 generates a detecting signal with the received bit pattern output by a comparator 42 which is identical with the wake-up bit pattern stored in the storage means 22 and sends the detecting signal to the wake-up command generating means 25.

Figure 6:
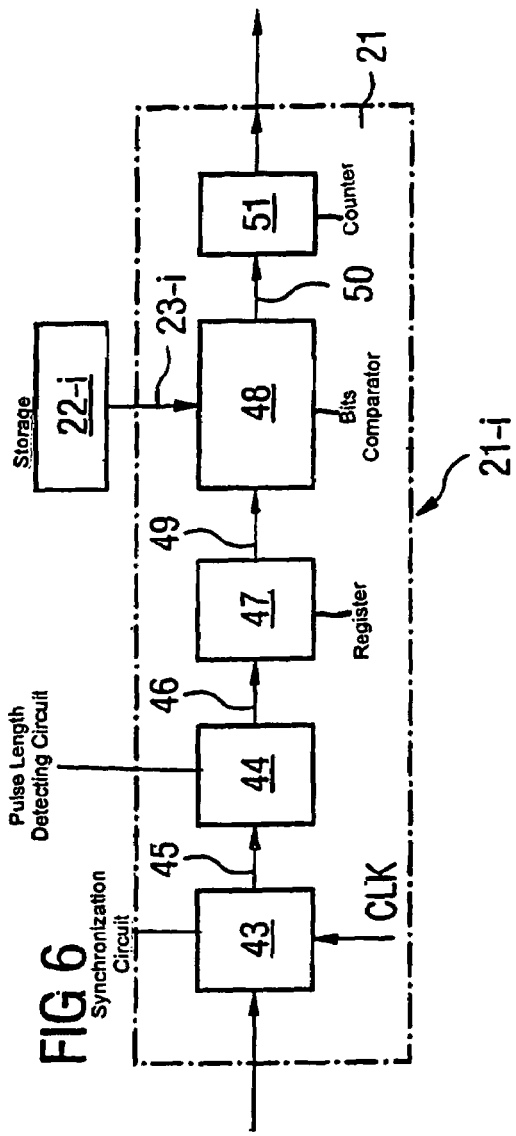
FIG. 6 shows a block diagram a bit pattern of a detecting means of the xDSL modem within the central office according the present invention.

FIG. 6 shows a preferred embodiment of the bit pattern detecting means 21. The bit pattern detecting means 21 comprises a synchronization circuit 43 for synchronizing the asynchronous pulse train received from the demodulating means 19. The received pulse train or bit pattern is synchronized with an internal clock signal. The detecting means 21 further comprises a pulse length detecting circuit 44 connected to the synchronization circuit 43 via line 45. The output of the pulse length detecting circuit 44 is connected on its output side via line 46 to a register 47 for temporarily storing the received bit pattern. A bit comparator 48 connected to the register 47 via a line 49 compares the received bit pattern stored in the register 47 with the wake-up bit pattern stored in the memory 22 and increments a counter 51 via a control line 50, when the received bit pattern and the stored bit pattern is identical. The wake-up command generating means 25 generates a wake-up command, when the counter 51 reaches an adjustable threshold value.

Figure 8A:
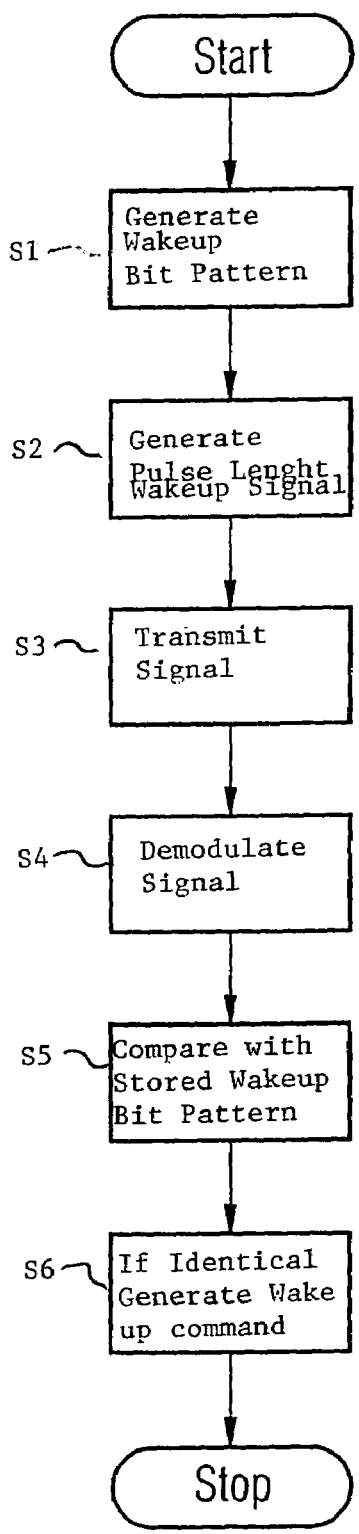
FIG. 8a, b show a flow diagram of the generation of a wake-up command signal by an xDSL modem within the central office according to the present invention.

FIG. 8a shows a flow diagram of a method for establishing a data transfer link between the xDSL user modem 4 and the corresponding xDSL modem 9 in the central office 10 according to the present invention.

In a step S1, a wake-up bit pattern identifying the xDSL user modem 4 is generated by a bit pattern generating circuit 16.

In a step S2, the generated wake-up bit pattern is used for pulse length modulating an upstream data signal to generate a pulse length modulated wake-up signal by means of a modulating circuit 18.

The pulse length modulated wake-up signal is transmitted from the user xDSL modem 4 via the telephone line 8 to the xDSL modem 9 within the central office 10 in a step S3.

In a further step S4, the transmitted wake-up signal is demodulated by demodulating means 19 within the wake-up signal detection unit 12 of the xDSL modem 9.

In a step S5, the demodulated wake-up signal is compared with a wake-up bit pattern stored in the register 22.

In step S6, a wake-up command signal is generated when the received bit pattern is identical with the stored wake-up bit pattern, and the modem 11 is switched from a sleep mode to an operation mode to start a start-up procedure.

After the modem 11 has been switched into the operation mode, the xDSL modem 9 commences a start-up procedure to establish a data link with the corresponding xDSL user modem 4. After the start-up procedure, the normal data transfer is performed. When the data transfer is finished, the xDSL modem 9 within the central office 10 is switched from the operation mode to the sleep mode.

Figure 8B:
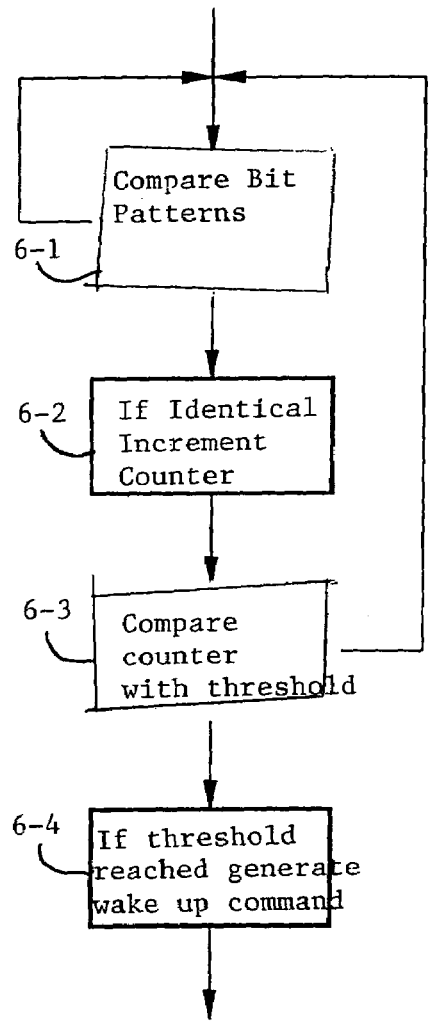

FIG. 8*b* shows a preferred embodiment of step S6 within the main routine according to the present invention as shown in FIG. 8*a*. The received bit pattern stored temporarily in register 47 is compared to the wake-up bit pattern stored in register 22 step 6-1, and when both bit patterns are identical, counter 51 of comparing means 21 is incremented in a step S6-2. The value of the counter 51 is compared in step S6-3 with a predetermined threshold value, and a wake-up command signal is generated in step S6-4 when the counter reaches the threshold value. The wake-up command signal switches the xDSL modem 9 from the sleep mode to the operation mode.

The invention claimed is:

1. A method for establishing a data transfer link between an xDSL user modem and a xDSL modem within a central office wherein the xDSL modem within the central office comprises:
   demodulating means for demodulating a received analog pulse length modulated signal;
   storing means for a wake-up bit pattern which identifies the xDSL user modem;
   comparing means for comparing the demodulated received signal with the stored wake-up bit pattern; and
   wake-up command generating means for generating a wake-up command to switch the xDSL modem within the central office from a sleep mode to an operation mode, when the demodulated received signal is identical with the stored wake-up bit pattern;
   wherein the demodulating means of the xDSL modem within the central office comprises a gain sequencer for amplifying the received analog signal with an adjustable gain;
   rectifying means for rectifying the amplified signal;
   a low-pass filter for filtering the rectified signal; and
   a comparator for comparing the filtered signal with an adjustable threshold generating an asynchronous pulse train which is supplied to the comparing means within the central office comprising the following steps:

(a) generating a wake-up bit pattern identifying the user xDSL modem;
   (b) pulse length modulating an upstream data signal with the generated wake-up bit pattern to generate a pulse length modulated wake-up signal;
   (c) transmitting the pulse length modulated wake-up signal from the user xDSL modem via a data transfer medium to the xDSL modem within the central office;
   wherein the xDSL modem within the central office performs the following steps
   (d) demodulating the transmitted wake-up signal;
   (e) comparing the demodulated wake-up signal with a stored wake-up bit pattern for the detection of a transmission of the wake-up bit pattern from the xDSL user modem;
   (f) generating a wake-up command signal, when the wake-up bit pattern is detected for switching the xDSL modem within the central office from the sleep mode to the operation mode for data transfer.

2. The method according to claim 1, wherein the xDSL modem within the central office commences a start-up procedure when it is switched to the operation mode.

3. The method according to claim 1, wherein the wake-up signal is transmitted periodically by the xDSL user modem.

4. The method according to claim 1, wherein the xDSL modem within the central office is switched from the operation mode to the sleep mode when the data transfer is finished.

5. The method according to claim 1, wherein a detection counter is incremented when the wake-up bit pattern is detected.

6. The method according to claim 5, wherein the wake-up command signal is generated when the detection counter reaches a threshold value.

7. The method according to claim 6, wherein the threshold value is adjusted.

8. An xDSL data transfer system for data transfer comprising at least one xDSL user modem connected via a data transfer medium to a corresponding xDSL; said xDSL user modem comprising:
   demodulating means for demodulating a received analog pulse length modulated signal;
   wherein demodulating means of the xDSL user modem comprises a gain sequencer for amplifying the received analog signal with an adjustable gain;
   rectifying means for rectifying the amplified signal;
   a low-pass filter for filtering the rectified signal; and
   a comparator for comparing the filtered signal with an adjustable threshold generating an asynchronous pulse train which is supplied to a bit pattern comprising means;
   storing means for storing a wake-up bit pattern which identifies a corresponding xDSL user modem;
   the bit pattern comparing means capable of comparing the demodulated received signal with the stored wake-up bit pattern; and
   wake-up command generating means for generating a wake-up command to switch the xDSL user modem from a sleep mode to an operation mode, when the demodulated received signal is identical with the stored wake-up bit pattern;
   wherein the corresponding xDSL user modem generates a pulse length modulated wake-up signal for switching the xDSL user modem within the central office from the sleep mode to the operation mode.

9. The xDSL data transfer system according to claim 8, wherein the xDSL user modem comprises generating means for generating a wake-up bit pattern identifying the xDSL user modem, and
  modulating means for the pulse length modulation of an upstream data signal with the wake-up bit pattern to generate the pulse length modulate wake-up signal,
  wherein the pulse length modulated wake-up signal has a spectrum within an xDSL upstream frequency band.

10. The xDSL data transfer system according to claim 9, wherein the generated wake-up bit pattern comprises 16 bits.

11. The xDSL data transfer system according to claim 9 wherein each bit of the wake-up bit pattern determines the duration of a pulse length of a pulse of the pulse length modulated wake-up signal.

12. The xDSL data transfer system according to claim 8, wherein the bit pattern comparing means comprises:
  a synchronization means for synchronizing the asynchronous pulse train with an internal clock signal;
  a pulse length detecting circuit for detecting a pulse length of each pulse in the synchronized received pulse train and generating a logical bit value corresponding to the detected pulse length;
  a register for temporarily storing a received bit pattern;
  a comparator which compares the received bit pattern with the stored wake-up bit pattern and increments a counter when the received bit pattern and the stored wake-up bit pattern are identical.

13. The xDSL data transfer system according to claim 12, wherein the wake-up command generating means generates the wake-up command when the counter reaches an adjustable threshold value.

14. The xDSL data transfer system according to claim 8, wherein the xDSL user modem and corresponding xDSL user modem are VDSL modems.

15. The xDSL data transfer system according to claim 8, wherein the data transfer medium is telephone line.

16. An xDSL modem comprising:
  a generating means for generating a wake-up bit pattern identifying the xDSL modem; and modulating means for the pulse length modulation of an upstream xDSL data signal with the generated wake-up bit pattern to generate a pulse length modulated wake-up signal, wherein the pulse length modulated wake-up signal has a frequency range within the xDSL upstream frequency band,
  and wherein a corresponding xDSL modem comprises:
  demodulating means for demodulating a received analog pulse length modulated signal;
  storing means for storing a wake-up bit pattern which identifies the xDSL modem;
  comparing means for comparing the demodulated received signal with the stored wake-up bit pattern; and
  wake-up command generating means for generating a wake-up command to switch the corresponding xDSL modem from a sleep mode to a operating mode, when the demodulated received signal is identical with the stored wake-up pattern;
  wherein the demodulating means of the corresponding xDSL modem comprises a gain sequencer for amplifying the received analog signal with an adjustable gain;
  rectifying means for rectifying the amplified signal;
  a low-pass filter for filtering the rectified signal;
  and a comparator for comparing the filtered signal with an adjustable threshold generating an asynchronous pulse train which is supplied to the comparing means.

17. An xDSL system comprising an xDSL modem within a central office wherein the xDSL modem comprises:
  demodulating means for demodulating a received analog pulse length modulated signal;
  storing means for storing a wake-up bit pattern which identifies a corresponding xDSL user modem;
  comparing means for comparing the demodulated received signal with the stored wake-up bit pattern;
  wake-up command generating means for generating a wake-up command to switch the xDSL modem from a sleep mode to an operation mode, when the demodulated received signal is identical with the stored wake-up bit pattern;
  wherein the comparing means comprises:
  a synchronization means for synchronizing an asynchronous pulse train with an internal clock signal;
  a pulse length detecting circuit for detecting a pulse length of each pulse in the synchronized pulse train and generating a logical bit value corresponding to the detected pulse length;
  a register for temporarily storing a received bit pattern;
  a comparator which compares the received bit pattern with the stored wake-up bit pattern and increments a counter, when the received bit pattern and the stored wake-up bit pattern are identical.

* * * * *